United States Patent [19]

Hanzelka et al.

[11] 4,076,298
[45] Feb. 28, 1978

[54] VEHICLE SIDE WALL AND METHOD OF MAKING SAME

[75] Inventors: Lubomir Hanzelka; Josef Vidlar; Ladislav Neuman, all of Koprivnice, Czechoslovakia

[73] Assignee: Tatra, narodni podnik, Koprivnice, Czechoslovakia

[21] Appl. No.: 691,976

[22] Filed: Jun. 2, 1976

Related U.S. Application Data

[62] Division of Ser. No. 527,013, Nov. 25, 1974, abandoned.

[30] Foreign Application Priority Data

Nov. 23, 1973 Czechoslovakia ............... 8095/73

[51] Int. Cl.² .......................................... B62D 27/00
[52] U.S. Cl. ................................. 296/28 R; 296/28 M
[58] Field of Search ................... 296/28 R, 28 M, 36

[56] References Cited

U.S. PATENT DOCUMENTS

| | | | |
|---|---|---|---|
| 2,585,976 | 2/1952 | Teeter | 296/28 M |
| 2,753,018 | 7/1956 | Curell | 296/28 M |
| 3,088,420 | 5/1963 | Faverty et al. | 296/28 M |
| 3,132,604 | 5/1964 | Collins et al. | 296/28 M |
| 3,195,477 | 7/1965 | Jones et al. | 296/28 M |
| 3,266,837 | 8/1966 | Stricker, Jr. et al. | 296/28 M |

FOREIGN PATENT DOCUMENTS

| | | | |
|---|---|---|---|
| 847,692 | 8/1952 | Germany | 296/28 M |

*Primary Examiner*—Lawrence J. Oresky
*Assistant Examiner*—Ross Weaver

[57] ABSTRACT

A one-part vehicle side wall and the method of its formation. On the longitudinal upper and lower edges of the wall there are formed from the material of the side wall an upper border and a lower border that during the assembly of the side walls complement each other in form. The upper strengthening border is provided with a concave formation into which the lower strengthening border fits and in which it is adjustable in steps. The method is characterized in that the side wall is made of a sheet steel strip by means of rolling on a rolling train in a single working pass in which there are partly formed the needed strengthening formations and partly also the bending of the strengthening borders into a final closed form.

3 Claims, 4 Drawing Figures

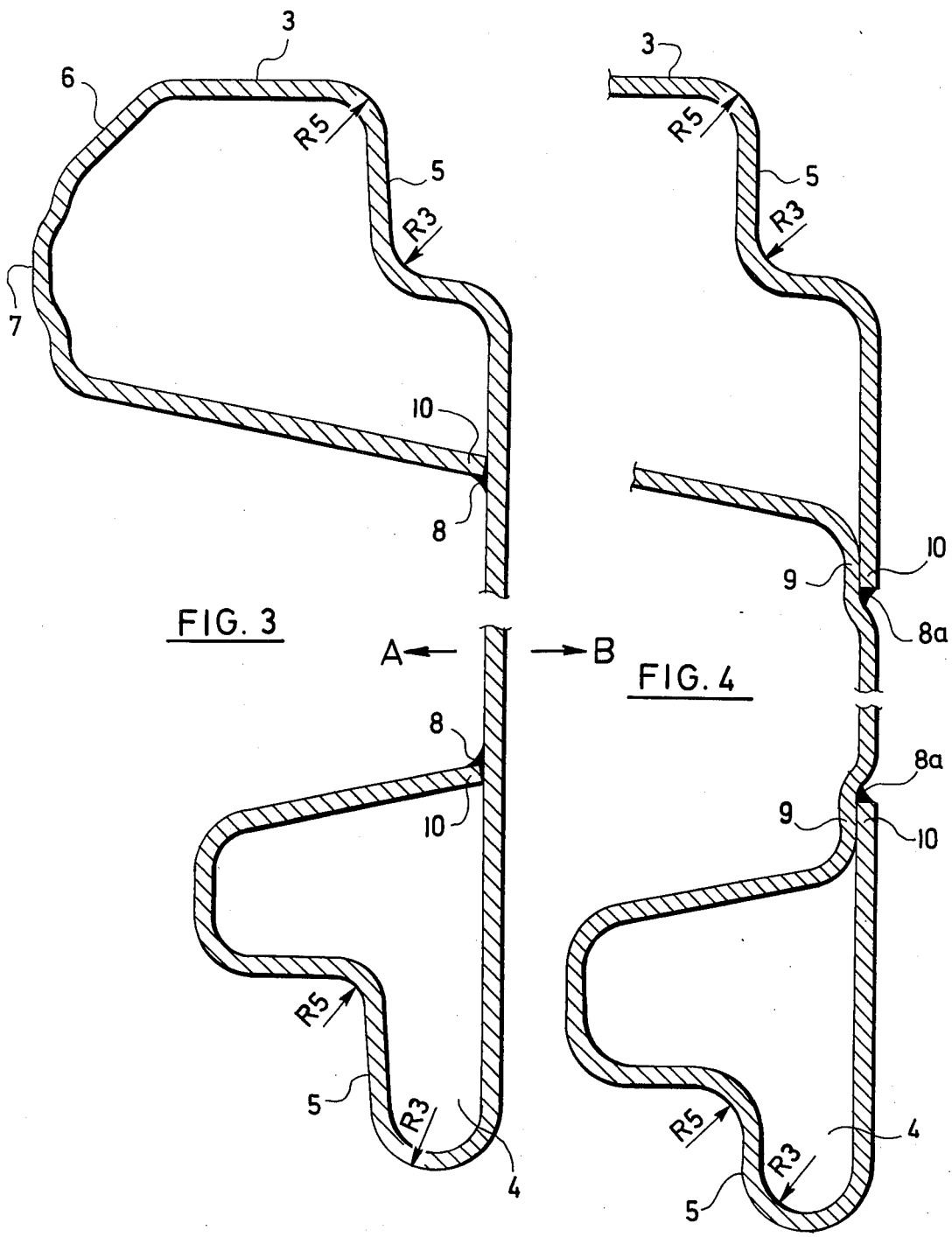

VEHICLE SIDE WALL AND METHOD OF MAKING SAME

This is a division of application Ser. No. 527,013 filed Nov. 25, 1974 now abandoned.

The invention relates to a one-part vehicle side wall, espcially for utility vehicles, and the method of manufacture of the same of sheet steel strips by means of rolling on rolling train in a single working procedure.

In the method of manufacture of the vehicle side walls employed until now, such walls are welded from previously prepared sheets and pressed stiffeners.

The side wall of the body according to a prior method is assembled of three uniformly opened hollow profiled girders, of an upper border profiled girder, and a lower profiled girder whose lower border reaches up to the longitudinal girder of the profiled vehicle frame and overlaps the same. All the profiles that form the side wall are screwed on the girders which are spaced in uniform or different distances along all the length of the side wall and which are distributed throughout its height. Flat cover plates are welded on the girders, and the part of the girders that protrudes below the side wall is twisted in suspension eyes.

A further known embodiment solves the problem by means of a self-supporting wall made of profiled strips which are connected together by means of clinching, each profile having on one of its longitudinal borders a groove and on the second longitudinal border a tongue which is engaged as a wedge with the groove of the adjacent profiled groove strip. Openings must be nevertheless made in the overlapping longitudinal borders of the profiled strips, such openings being for the reception of connecting screws by means of which the wedges and the tongues of the connected profiled strips are held in position.

Another side wall is also known that consists of an outer covering sheet and an inner stiffening sheet that are connected on their outer borders, and wherein a further connection of both sheets is performed by means of expanding sheets that are pressed out of the inner stiffening sheet or are connected with the same.

Construction elements are also known having arched springing and gripping projections or grooves that run along their edges, at the same time a free edge of the groove being bent in to prevent the disengaging of the free edge of the groove from the groove of the adjacent construction element.

A formerly used method employs connecting parts in the form of a punch and a die that overlap one another along their edges, the punch having the form of a batten which protrudes downwards along the outer edge, and the die having a form of a groove which is opened to the top and which runs on the second side of the edge, the supports that are directed downwards being provided with flanges that are bent to the side, and in the assembling of the two parts of which and in the engagement of the punch and the die, the parts are made self-locking.

The disadvantages of all these methods consist in that there is a need of a considerable number of differently arranged parts, the manufacture of the same is complicated and expensive, and these parts must be connected by means of welding, screwing together, etc.

The above-mentioned disadvantages are removed by a side wall according to the invention. On longitudinal upper and lower border edges of the side wall of the invention there are formed from the material of the side wall an upper border and a lower border that, during the assembly of the side wall, complement each other in form so that the upper strengthening border is provided with an inner round radius into which there fits a lower strengthening border, the parts being adjustable in steps, by a projection which is rounded with the same radius which corresponds in the form to the compact of the upper strengthening border. The lower strengthening border is provided with an inner radius into which there fits the round of the upper strengthening border having the same radius. In the method of manufacture of the side wall according to the invention, the side wall is made of a sheet steel strip by means of rolling on a rolling train in a single working pass in which there are partly formed the needed strengthening shapes and partly also the bending of the strengthening borders into the final form. At the same time as the folling of the strengthening borders there is advantageously performed the connection of the ends of the borders to the wall of the side wall by means of welds.

An embodiment of the side wall according to the invention is shown on the accompanying drawings, wherein:

FIG. 3 is a view in cross-section of the side wall with an upper and a lower strengthening border where the ends of the borders are bent to the outside of the side wall, and FIG. 4 shows the same cross-section with the ends bent to the inner side of the side wall.

Figures 1, 2:
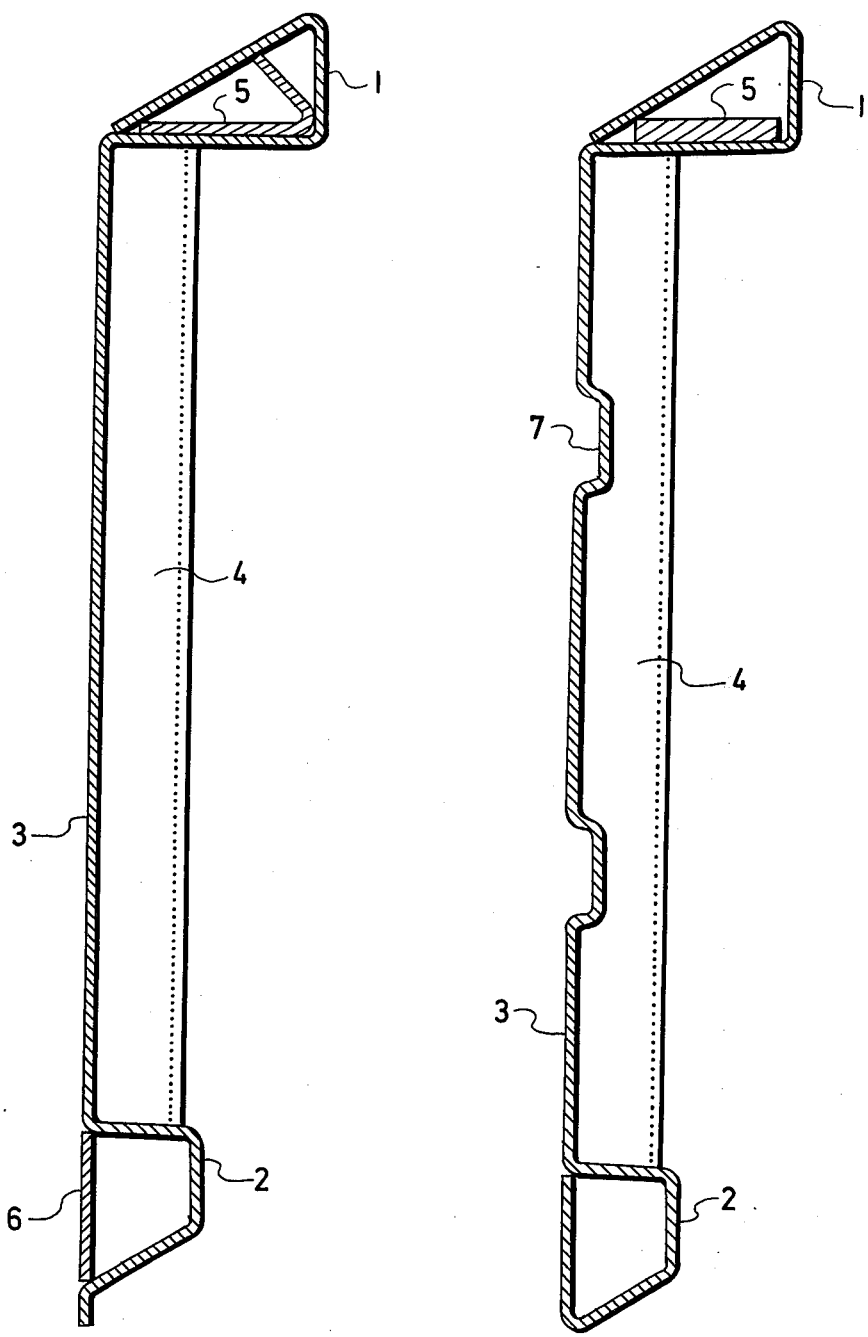
FIG. 1 is a view in section through the side wall with a closed upper strengthing border and an opened lower strengthening border.
FIG. 2 is a view in section through the side wall with a rolled closed upper and lower strengthening border and with longitudinal strengthening formations.

In the embodiments according to FIGS. 1 and 2, the side wall is provided with an upper strengthening border 1, a lower strengthening border 2, and a middle flat wall 3. The upper strengthening border is constructed as a closed border, whereas the lower strengthening border is, as shown in FIG. 1, constructed as an opened border, and it is closed by the subsequent welding of an insert 6. The strengthening may be performed by means of an appropriately formed insert 5 at the places of the greatest stress of the upper strengthening border. The wall 3, in the case of greater dimensions of the middle flat wall 3 and by this of a greater surface stress, may be stiffened by longitudinal formations 7 or by a stiffener 4 which is disposed normal to the longitudinal borders or to the edges of the side wall.

The embodiments according to FIGS. 3 and 4 are also provided with an upper strengthening border 1 and a lower strengthening border 2. The upper strengthening border 1 has at the top a horizontal flattening 3 which passes on the outer side of the side wall into a bevelling 6, and on the inner side into a formation 5 with a convex portion having a radius of $R_5$ and an adjacent concave portion having a radius of $R_3$. On the lower strengthening border 2 there is provided a complementary formation 5 with a concave projection having the radius $R_5$ and an adjacent convex portion, in the form of a projection 4, having the radius $R_3$. With this arrangement, the projection 4 of the lower strengthening border 2 of a side wall may be engaged in the concave portion in the upper strengthening border of an underlying side wall, so that a plurality of the side walls may be vertically stacked. The borders may, as needed, be provided with longitudinal strengthening formations as it is, by way of illustration, demonstrated by the formation 7 in the upper border 1. The bending of the border may be executed in either the inward or the outward direction.

FIG. 3 shows the bending of the border in the outward direction (arrow A), whereas FIG. 4 shows bending in the inward direction (arrow B). The differences between the two consist only in the formation of the weld 8, 8a at the end 10 of the upper and the lower border, which in FIG. 3 is situated on the outer side of the side wall, and that in FIG. 4 on its side the sidewall provides an arrangement of a further formation 9 in which the end 10 of the upper border 1 is engaged to prevent distortion of the flat surface of the inner side of the side wall.

The method of manufacture of the side wall according to the invention is particularly characterized in that the side wall is made of a sheet steel strip that is adjusted for the appropriate dimension by rolling in a suitably arranged rolling train in a single working pass in which the needed strengthening formations are partly formed, and also the bending of the strengthening borders into a final closed form is partly carried out. Simultaneously with the rolling there may be formed the connection of the strengthening borders in their ends 10 to the wall of the side wall by means of welds 8, 8a.

The advantages of the side walls manufactured according to this method consist in that, by the rolling of the profile from one piece as a whole in a single working procedure, the number of operations needed for the preparatory arrangement of the starting material are considerably reduced, and also the number of the necessary welds are considerably reduced. A preliminary rolling of the compacts is also made unnecessary.

The side walls manufactured according to the invention are used with advantage, for instance, for the bodies of utility vehicles that are exposed to great stresses, and the strengthening, as needed, is positioned in those places of maximum stress. The manufacture according to the method of the invention is more rapid and more economical in comparison with the well-known methods of rolling and welding heretofore used.

Although the invention is illustrated and described with reference to a plurality of preferred embodiments thereof, it is to be expressly understood that it is in no way limited to the disclosure of such a plurality of embodiments, but is capable of numerous modifications within the scope of the appended claims.

What is claimed is:

1. In a one-piece vehicle sidewall comprising a central elongated plate portion bent around at its respective opposite ends into unitary, substantially closed upper and lower strengthening borders having respectively, upwardly and downwardly facing broad surfaces, the upper border being provided in a first localized region of the broad surface thereof with a concave portion having a first predetermined radius and an adjacent convex portion having a second predetermined radius, the lower border being further provided in a second localized region of the broad surface thereof with a convex portion having said first radius and an adjacent concave portion having said second radius, the first and second localized regions being respectively located in complementary fashion on the respective upper and lower borders to permit longitudinal stacking of a plurality of the side walls with the broad surfaces of the upper and lower strengthening borders of the respective side walls in mating engagement with each other.

2. A side wall as defined in claim 1, in which the central portion has an inner and an outer surface, in which the upper border defines a substantially closed first bend extending from a first point on the central portion of the side wall to the outer surface of a second point of said central portion below the first point, and in which the lower border defines a closed second bend extending from a third point on said central portion to the outer surface of a fourth point of said central portion above the third point.

3. A side wall as defined in claim 1, in which the central portion has an inner and an outer surface, in which the upper strengthening border defines a closed first bend extending from a first point of said central portion to the outer surface of a second point of said central portion below the first point, and in which the lower border defines a closed second bend extending from a third point on said central portion to the inner surface of a fourth point on said central portion above the third point.

* * * * *